(12) United States Patent
Azami et al.

(10) Patent No.: US 7,508,859 B2
(45) Date of Patent: Mar. 24, 2009

(54) OPTICAL SCANNING APPARATUS

(75) Inventors: Junya Azami, Mishima (JP); Mitsuhiro Obara, Susono (JP); Hisanori Kobayashi, Odawara (JP); Atsushi Sano, Tokyo (JP); Kenji Shima, Suntoh-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/934,075

(22) Filed: Nov. 1, 2007

(65) Prior Publication Data
US 2008/0063023 A1 Mar. 13, 2008

Related U.S. Application Data

(63) Continuation of application No. PCT/JP2007/061397, filed on May 30, 2007.

(30) Foreign Application Priority Data
Jun. 5, 2006 (JP) .............................. 2006-156064

(51) Int. Cl.
*H01S 3/08* (2006.01)
(52) U.S. Cl. ...................................... 372/101; 372/107
(58) Field of Classification Search ................. 372/101, 372/107
See application file for complete search history.

(56) References Cited

U.S. PATENT DOCUMENTS 4,731,795 A * 3/1988 Clark et al. ................. 372/107
4,812,015 A 3/1989 Iizuka et al. ................. 350/252
5,740,294 A * 4/1998 Baumann et al. .............. 385/93
6,025,963 A 2/2000 Hippenmeyer et al. ....... 359/819
6,928,100 B2 8/2005 Sato et al. .................... 372/109

FOREIGN PATENT DOCUMENTS

| DE | 197 02 573 | 7/1998 |
| JP | 4-328515 | 11/1972 |
| JP | 61-165513 | 10/1986 |
| JP | 63-134134 | 6/1988 |
| JP | 5-301111 | 11/1993 |
| JP | 2002-244062 | 8/2002 |
| JP | 2004-37836 | 2/2004 |

OTHER PUBLICATIONS

International Search Report and Written Opinion from corresponding PCT Application No. PCT/JP2007/061397.

* cited by examiner

*Primary Examiner*—Armando Rodriguez
(74) *Attorney, Agent, or Firm*—Fitzpatrick, Cella, Harper & Scinto

(57) ABSTRACT

To provide an optical scanning apparatus which is strong against an external stress while suppressing an increase in the number of parts, an inserting portion 6 into which a laser light source unit 1 can be inserted is provided for a frame member 5. In a state where the laser light source unit 1 has been inserted into the inserting portion 6, the laser light source unit 1 and the inserting portion 6 of the frame member 5 are interference-fitted in two positions (front edge side fitting portion 4a and front edge side contact portion 6a; root side fitting portion 4b and root side contact portion 6b) which are away from each other in an optical axial direction.

5 Claims, 7 Drawing Sheets

OPTICAL SCANNING APPARATUS

This application is a continuation of International Application No. PCT/JP2007/061397 filed on May 30, 2007, which claims the benefit of Japanese Patent Application No. 2006-156064 filed Jun. 5, 2006.

BACKGROUND OF THE INVENTION

1. Field of the Invention

The present invention relates to an optical scanning apparatus which is used for a copying apparatus, a laser beam printer, or the like.

2. Description of the Related Art

Hitherto, a laser light source unit in which a semiconductor laser and a collimator lens have been constructed as a unit is assembled to an optical scanning apparatus which is used for an image forming apparatus of an electrophotographic type such as copying apparatus, laser beam printer, or the like. When the laser light source unit is assembled to a frame member of the optical scanning apparatus, it is necessary that an optical axis which has been predetermined according to a layout of the semiconductor laser and the collimator lens in the laser light source unit is precisely positioned to the frame member. For this purpose, as a construction which has often been used hitherto, there is a construction in which a laser holder 10 to hold a semiconductor laser and a collimator lens is fitted into a fitting hole H10 provided in a side wall of an optical box H and an attaching portion 18 of the laser holder 10 is fixed with screws K2 in a state where it has been abutted to the side wall of the optical box H in an optical axial direction (refer to Japanese Patent Application Laid-Open No. 2002-244062). However, in the case of such a construction, since the screws are used to fix the laser holder 10 to the optical box H, the number of parts increases. Since a space adapted to abut the attaching portion 18 of the laser holder 10 to the side wall of the optical box H and fix the attaching portion with the screws is necessary, it becomes an obstacle to miniaturization of the optical scanning apparatus. Particularly, in the case of using a plurality of laser light source units having a plurality of semiconductor lasers, since it is considered to closely arrange the plurality of laser light source units in order to use a laser circuit board in common and to simplify the assembling work, such a construction is disadvantageous in terms of the miniaturization of the optical scanning apparatus.

Therefore, as a construction to solve the latter problem, a construction in which a plurality of laser light source units are fixed by one spring without using any screws has been disclosed in Japanese Patent Application Laid-Open No. 2004-037836. FIG. 1 is a schematic diagram illustrating a plurality of laser light source units fixed with one spring in the related art.

In FIG. 1, a laser light source unit 530 has a semiconductor laser 539, a collimator lens 538, a laser holder 504, and the like. In this example, the two laser light source units 530 are provided.

Ribs 506 in a channel member cross sectional shape having an almost U-character shape (cross section in which two members are vertically extended from both edges of a horizontal member) are projected on an optical box 536 on which a polygon mirror, a scanning lens, and the like (not shown) have been attached. A plate spring 503 is provided for the optical box 536. The laser holder 504 is urged to the ribs 506 by arm portions 503a of the plate spring 503, thereby fixing the laser light source units 530 to the optical box 536.

FIG. 2 is a schematic diagram illustrating a color image forming apparatus having an optical scanning apparatus to which the laser light source units in the related art have been assembled.

According to the color image forming apparatus illustrated in FIG. 2, images of four colors of Y, M, C, and Bk are formed on surfaces of four photosensitive drums 610 and overlaid onto a transfer belt 611, thereby forming a full color image. For this purpose, an optical scanning apparatus 600 has the two laser light source units 530, thereby forming the images of two colors. In the color image forming apparatus illustrated in FIG. 2, the two optical scanning apparatuses 600 are provided, thereby coping with four colors. The optical scanning apparatus 600 has therein a polygon mirror 601, scanning lenses 602 and 603, and reflecting mirrors 604.

However, in the case of the related art as mentioned above, a force of constraint by the urging force applied by the plate spring 503 is weak. When an external stress (for example, a difference of thermal expansion of the members due to a temperature change, attachment of a laser driver circuit board (not shown), or the like) is applied, there is a risk that the position of the laser light source unit changes. If the position of the laser light source unit changes, a change in position of a scanning line on the photosensitive drum or a deterioration of image forming performance occurs.

Since the plate spring 503 is used to fix the laser light source units 530 to the optical box 536, the number of parts increases.

SUMMARY OF THE INVENTION

It is an object of the invention to provide an optical scanning apparatus which is strong against an external stress while suppressing an increase in the number of parts.

Another object of the invention is to provide an optical scanning apparatus comprising: a laser light source which emits a laser beam; a collimator lens which converts the laser beam emitted from the laser light source into a parallel beam; a cylindrical holding member which holds the laser light source and the collimator lens; and a frame member having a cylindrical hole into which the cylindrical holding member is inserted, wherein the cylindrical holding member is fitted in an interference fitting manner in two positions which are away from each other in an optical axial direction in the cylindrical hole of the frame member.

Another object of the invention is to provide an optical scanning apparatus comprising: a first cylindrical holding member which holds a first laser light source for emitting a first laser beam and a first collimator lens for converting the first laser beam emitted from the first laser light source into a parallel beam; a second cylindrical holding member which holds a second laser light source for emitting a second laser beam and a second collimator lens for converting the second laser beam emitted from the second laser light source into a parallel beam; and a frame member having a first cylindrical hole into which the first cylindrical holding member is inserted and a second cylindrical hole into which the second cylindrical holding member is inserted, wherein the first cylindrical holding member and the second cylindrical holding member are juxtaposed in a direction perpendicular to an optical axis, the first cylindrical holding member is fitted in an interference fitting manner in two positions which are away from each other in an optical axial direction in the first cylindrical hole of the frame member, and the second cylindrical holding member is fitted in an interference fitting manner in two positions which are away from each other in the optical axial direction in the second cylindrical hole of the frame member.

Other objects of the invention will be apparent from the following description and the accompanying drawings.

Further features of the present invention will become apparent from the following description of exemplary embodiments with reference to the attached drawings.

DESCRIPTION OF THE EMBODIMENTS

An exemplary embodiment for embodying the invention will be described as an example in detail hereinbelow with reference to the drawings. However, dimensions, materials, shapes, a relative layout, and the like of component parts disclosed in the embodiment should be properly modified according to a construction of an apparatus to which the invention is applied and various conditions and do not limit the scope of the invention to the following embodiment.

Embodiment

Figure 1:
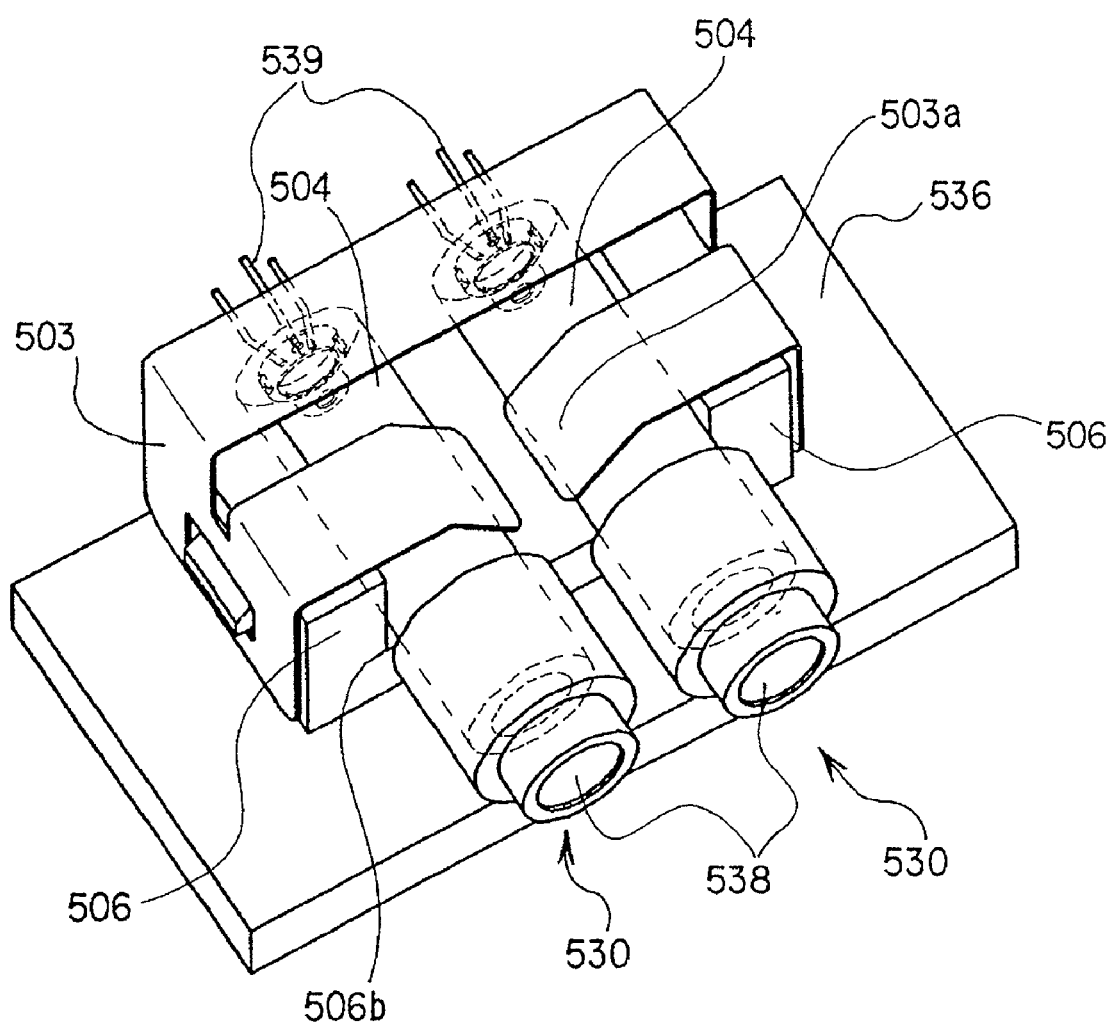
FIG. 1 is a diagram for describing a laser light source unit in the related art.
Figure 2:
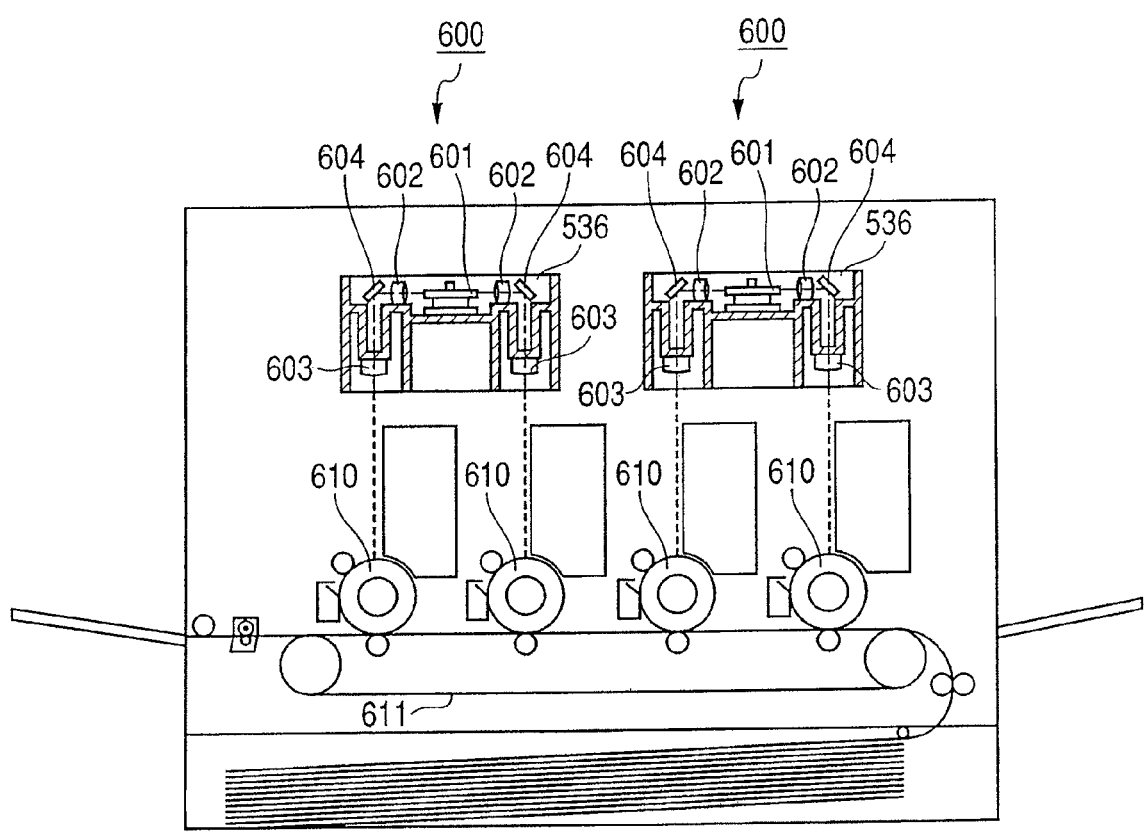
FIG. 2 is a diagram for describing a color image forming apparatus in the related art.
Figure 3:
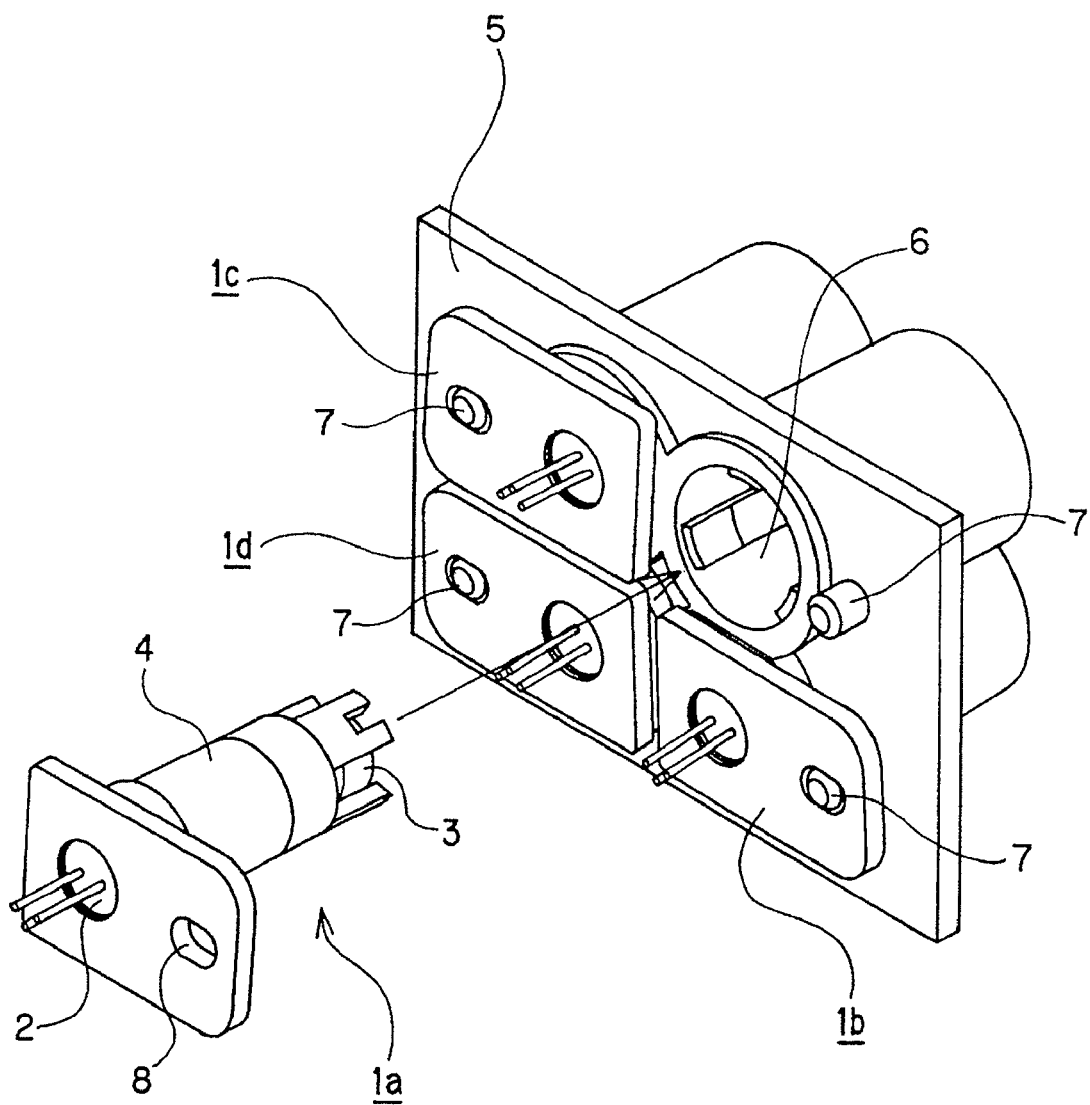
FIG. 3 is a diagram for describing laser light source units according to an embodiment.
Figure 4:
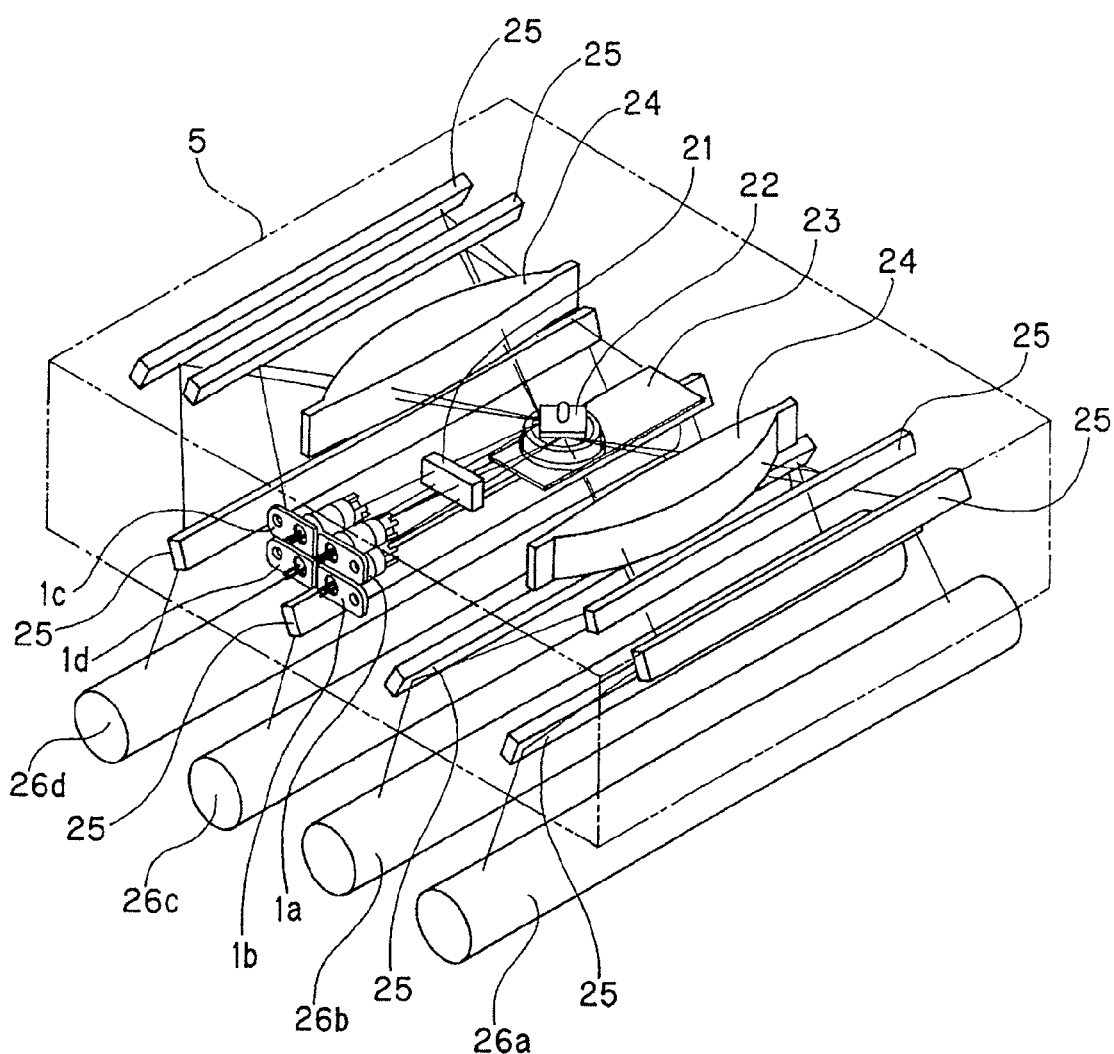
FIG. 4 is a diagram for describing an optical scanning apparatus according to the embodiment.

FIGS. 3 and 4 are diagrams for describing an optical scanning apparatus to which the invention can be applied. FIG. 4 is the diagram illustrating the whole optical scanning apparatus. FIG. 3 is the diagram illustrating laser light source units and their peripheral components.

In FIG. 3, four laser light source units 1a, 1b, 1c, and 1d are mounted to the optical scanning apparatus. The laser light source units 1a to 1d fundamentally have the same construction. Each of them is constructed by a semiconductor laser 2 as a light source, a collimator lens 3, and a cylindrical holding member which holds the light source and the collimator lens. Inserting portions 6 as cylindrical holes of the number as many as the number of laser light source units 1a, 1b, 1c, and 1d, rotation blocking pins 7 and long holes 8 formed in the holding member 4 are formed in a frame member 5 of the optical scanning apparatus. As illustrated in FIG. 3, a plurality of inserting portions 6 are formed in the frame member 5 so that a plurality of laser light source units 1a to 1d can be inserted from the same direction.

An outline of the optical scanning apparatus will now be described with reference to FIG. 4.

In FIG. 4, a cylindrical lens 21, a polygon mirror 22, a scanner motor 23, scanning lenses 24 serving as imaging devices, reflecting mirrors 25, and photosensitive drums 26a, 26b, 26c, and 26d serving as image holding members are arranged in the optical scanning apparatus. The polygon mirror 22 and the scanner motor 23 construct a deflecting unit.

The operation of the optical scanning apparatus will now be described.

In the laser light source units 1a to 1d, the laser beam of the divergent light emitted from the semiconductor laser 2 is converted into the parallel beam by the collimator lens 3 or into the laser beam of a specified convergent ratio within a range where it is almost parallel and the laser beam is generated.

When the laser beam passes through the cylindrical lens 21, it is converged only in the subscanning direction and formed as a line image onto a reflecting surface of the polygon mirror 22.

The polygon mirror 22 is rotated by the scanner motor 23 and deflects the laser beam.

The deflected laser beam passes through the scanning lenses 24 and the reflecting mirrors 25 and forms scanning line images onto the photosensitive drums 26a to 26d (surfaces of the photosensitive drums) serving as scanned surfaces.

Developing units (not shown) containing Y (yellow), M (magenta), C (cyan), and Bk (black) toner are disposed at positions adjacent to the photosensitive drums 26a to 26d. Toner images of the colors developed by the developing units are overlaid onto a transfer belt (not shown) or the like, thereby forming a full color image.

Therefore, the laser light source units 1a to 1d flicker in correspondence to the images of Y, M, C, and Bk, respectively.

Figure 5:
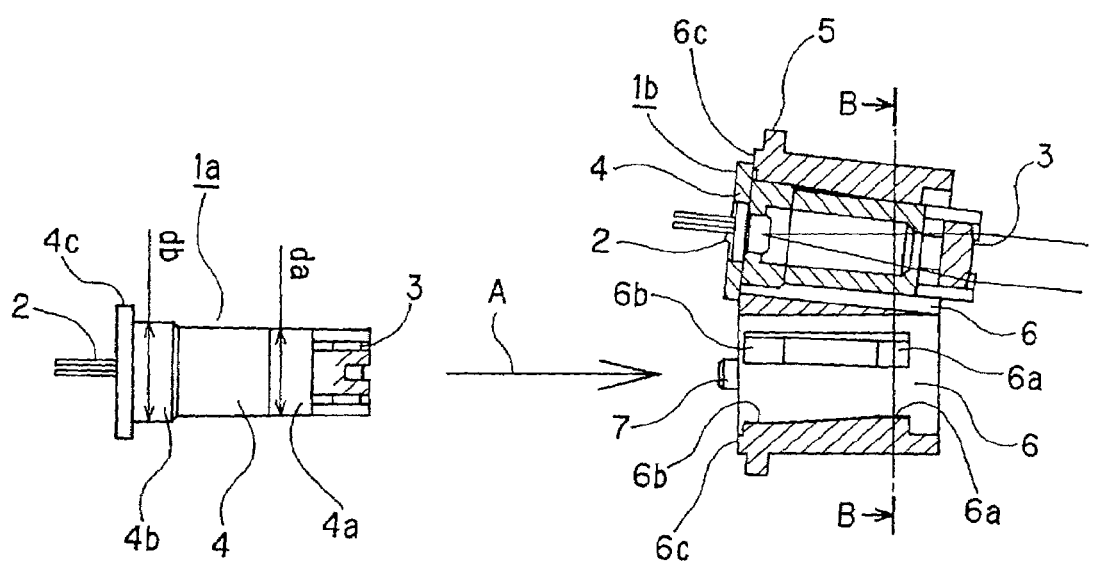
FIG. 5 is a schematic cross sectional view for describing a light source inserting portion according to the embodiment.
Figure 6:
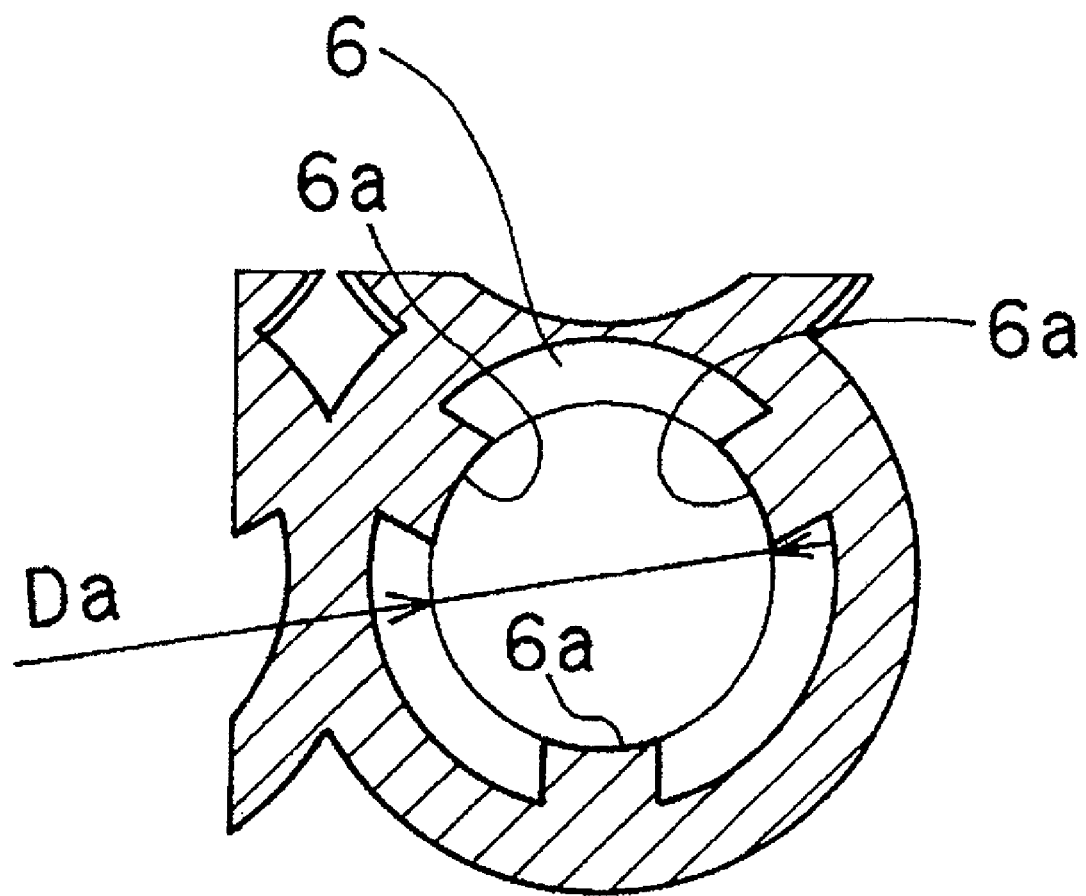
FIG. 6 is a schematic cross sectional view for describing the light source inserting portion according to the embodiment.

FIG. 5 is a partial cross sectional view illustrating the laser light source unit 1 and the inserting portion 6 of the frame member 5. FIG. 6 is a cross sectional view taken along the line B-B in FIG. 5. In FIG. 5, an upper side illustrates a state where the laser light source unit 1 has been assembled to the frame member 5 and a lower side illustrates a state before the laser light source unit 1 is assembled.

The laser light source unit 1 and the inserting portion 6 will be described in detail with reference to those diagrams.

The cylindrical holding member 4 has a cylindrical front edge side fitting portion 4a and a cylindrical root side fitting portion 4b. The holding member 4 further has an almost plate-shaped flange portion 4c on the side where the holding member 4 holds the light source. A front edge side contact portion 6a and a root side contact portion 6b are provided for an inner peripheral surface of the inserting portion 6 of the frame member 5. As illustrated in FIG. 6, the front edge side contact portions 6a are arranged in three positions in the circumferential direction. Similarly, the root side contact portions 6b are also arranged in three positions in the circumferential direction.

A diameter Da of an inscribed circle of each of the front edge side contact portions 6a in three positions is slightly smaller than an outer diameter da of the front edge side fitting portion 4a of the holding member 4 (Da<da). Similarly, a diameter Db of an inscribed circle of each of the root side contact portions 6b in three positions is slightly smaller than an outer diameter db of the root side fitting portion 4b (Db<db).

In the inserting portion 6, the inscribed circle diameter of each of the front edge side contact portion 6a and the root side contact portion 6b gradually decreases as it approaches from the entrance side to the rear side in the inserting direction of the laser light source unit 1 (decreases to a value which is almost equal to the diameter of the inscribed circle arranged on the downstream side (front edge side) in the inserting direction). In the holding member 4, similarly, an outer diameter of each of the front edge side fitting portion 4a and the root side fitting portion 4b also decreases as it approaches from the entrance side to the rear side in the inserting direction of the laser light source unit 1. That is, there is a relation (Da<Db) between the diameters Da and Db and there is a relation (da<db) between the outer diameters da and db, respectively.

Therefore, when the laser light source unit 1 is assembled to the frame member 5, in other words, when the holding member 4 of the laser light source unit 1a is inserted into the inserting portion 6 from the direction of an arrow A, a state where the front edge side fitting portion 4a has been fitted into the front edge side contact portion 6a in an interference fitting manner and the root side fitting portion 4b has been fitted into the root side contact portion 6b in an interference fitting manner is obtained. Thus, the optical axis of the laser light source unit 1 is positioned to the frame member 5.

In the assembly completion state, since the flange portion 4c is abutted to an abutting surface 6c of the frame member, the positioning in the optical axial direction is performed. Since the rotation blocking pin 7 is fitted into the long hole 8, the rotation of the laser light source unit 1 is blocked.

As mentioned above, the cylindrical holding member 4 of the laser light source unit 1 has been fitted into the inserting portion (cylindrical hole) 6 in an interference fitting manner in two positions which are away from each other in the light axial direction. Thus, the optical axis of the laser light source unit 1 is positioned to the frame member 5. The cylindrical holding member 4 of the laser light source unit 1 and the inserting portions (cylindrical holes) 6 of the frame member 5 are in contact with each other in at least three positions in the circumferential direction in the two positions which are away from each other in the optical axial direction (the front edge side fitting portion 4a and the front edge side contact portions 6a; the root side fitting portion 4b and the root side contact portion 6b), respectively. Thus, since forces which are applied in the circumferential direction in the interference fitting manner are balanced, the optical axis of the laser light source unit 1 can be easily and precisely positioned to the frame member 5.

In the embodiment, the holding member 4 of the laser light source unit 1 and the inserting portion 6 of the frame member 5 have been fitted in an interference fitting manner in the two positions which are away from each other in the light axial direction, the invention is not limited to such an example but may be fitted in an interference fitting manner at three or more positions. Although the holding member 4 of the laser light source unit 1 are in contact with the inserting portion 6 of the frame member 5 in the two positions which are away from each other in the optical axial direction and in three positions in the circumferential direction, respectively, the invention is not limited to such an example but they may be come into contact at four or more positions in the circumferential direction, respectively.

Effects of the embodiment will now be described.

In the embodiment, when the laser light source unit 1 is merely inserted into the inserting portion 6 of the frame member 5, the optical axis of the laser light source unit 1 is positioned to the frame member 5. As mentioned above, since the laser light source unit 1 is fixed in an interference fitting manner in two positions in the optical axial direction and in three positions in the circumferential direction, it can be precisely and strictly fixed to the frame member 5 without any gutter. Therefore, the apparatus is strong against the external stress which has caused the problem hitherto and a positional change of the laser light source unit 1 is not caused. Since a fixing member (corresponding to a plate spring in the related art) is unnecessary and the increase in the number of parts is suppressed, assembling performance is improved and parts costs can be also reduced.

In the apparatus in which in order to form the scanning lines of four colors from one optical scanning apparatus, two right and left laser light source units and, further, two upper and lower laser light source units, that is, a plurality of laser light source units are two-dimensionally arranged (refer to FIG. 4), in the case of using the plate spring as a fixing member in a manner similar to that of the related art, it is necessary to prepare the two upper and lower plate springs. In such a case, the number of parts increases, the costs increase, and further, it is necessary to change an assembling direction of the lower-side plate spring from that of the upper plate spring by 180°. There is a risk that the assembling work also becomes difficult.

In the embodiment, since all of the four laser light source units 1 can be assembled from the same direction, even in the case where a plurality of laser light source units are two-dimensionally arranged, assembling workability can be improved without increasing the step of changing the position of the frame member 5 upon assembling.

As mentioned above, according to the embodiment, it is possible to provide the optical scanning apparatus which is strong against the external stress, the costs are low, and it can be easily assembled while preventing the number of parts from increasing and preventing the number of assembling directions from becoming a plural number.

It is not desirable to set the difference between the diameters Da and da and the difference between the diameters Db and db into too large values but is desirable to keep them to values adapted to perform what is called press fitting. This is because if a pressing force necessary for the press fitting is too high, a pressing apparatus or the like is necessary for the assembling work or the holding member 4 is deformed.

Figure 7:
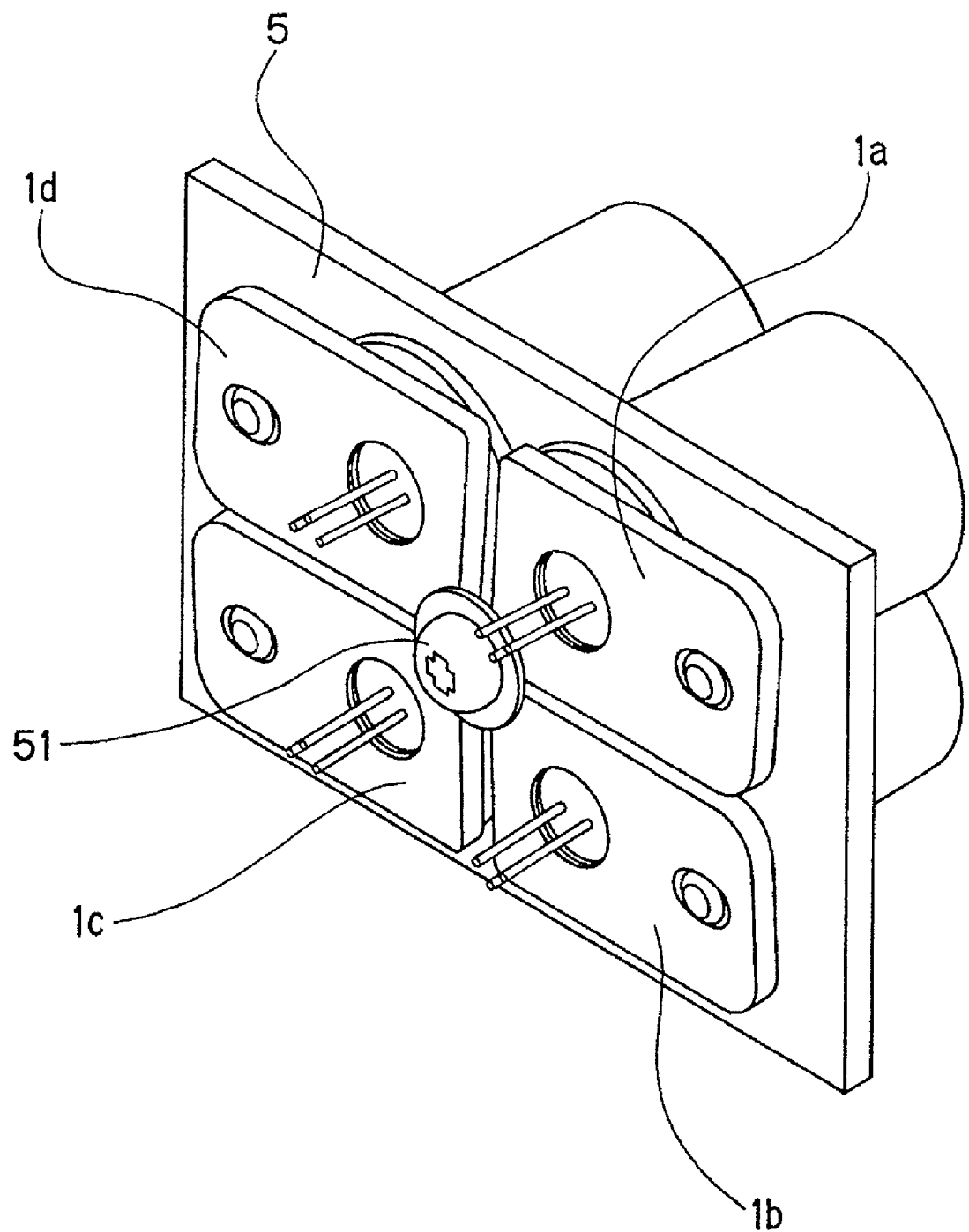
FIG. 7 is a diagram for describing a pull-out blocking unit of the laser light source unit according to the embodiment.

In this case, it is desirable to add a pull-out blocking unit in order to prevent the laser light source unit 1 from being pulled out in the optical axial direction after the assembly. FIG. 7 is a diagram illustrating an example in which one screw 51 is used as a pull-out blocking unit. If the optical axis of the laser light source unit 1 is fixed to the frame member merely by using a construction around the optical axis as illustrated in the embodiment, the four laser light source units 1a to 1d can be closely arranged. Therefore, since it is sufficient to use only one screw in order to fix the four laser light source units 1a to 1d in the optical axial direction, the increase in the number of parts can be suppressed.

It is also possible that the rotation blocking pins 7 are abandoned, when the laser light source unit 1 is assembled, it is rotated around the optical axis, and a phase adjustment is made. Such a construction is effective, for example, when a polarizing direction of the laser beam emitted from the semiconductor laser 2 is adjusted or when an interval between the scanning lines corresponding to light emitting points on the photosensitive drums 26 is adjusted in the case of what is called a multi-beam laser in which the semiconductor laser 2 has a plurality of light emitting points.

Although the embodiment has been described by using the cylindrical holding member 4 over the whole circumference, as for the shape of the holding member 4, it is sufficient that a contact portion between the holding member 4 and the inserting portion (cylindrical hole) 6 of the frame member 5 has a cylindrical shape. For example, it is also possible to use such an almost cylindrical shape that there is a partial notch or a rectilinear portion in the circumferential direction other than the contact portion.

The holding member 4 has the cylindrical shape and the front edge side contact portion 6a and the root side contact portion 6b are provided in a projecting shape for the inserting portion 6 of the frame member 5. However, naturally, such a relation may be reversed and it is also possible to use such a construction that the inserting portion 6 has the cylindrical shape and a contact portion is formed in a projecting shape for the holding member 4.

Although the embodiments of the invention have been described above, the invention is not limited to the foregoing embodiments but many modifications and variations are possible within the technical idea of the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-156064, filed Jun. 5, 2006, which is hereby incorporated by reference herein in its entirety.

What is claimed is:

1. An optical scanning apparatus comprising:
   a laser light source which emits a laser beam;
   a collimator lens which converts the laser beam emitted from the laser light source into a parallel beam;
   a cylindrical holding member which holds the laser light source and the collimator lens; and
   a frame member having a cylindrical hole into which the cylindrical holding member is inserted,
   wherein the cylindrical holding member is fitted in an interference fitting manner in two positions which are away from each other in an optical axial direction of the laser beam emitted from the laser light source in the cylindrical hole of the frame member.

2. An optical scanning apparatus according to claim 1, wherein the cylindrical holding member is fitted in an interference fitting manner in at least three positions in a circumferential direction in the two positions which are away from each other in the optical axial direction in the cylindrical hole.

3. An optical scanning apparatus comprising:
   a first cylindrical holding member which holds a first laser light source for emitting a first laser beam and a first collimator lens for converting the first laser beam emitted from the first laser light source into a parallel beam;
   a second cylindrical holding member which holds a second laser light source for emitting a second laser beam and a second collimator lens for converting the second laser beam emitted from the second laser light source into a parallel beam; and
   a frame member having a first cylindrical hole into which the first cylindrical holding member is inserted and a second cylindrical hole into which the second cylindrical holding member is inserted,
   wherein the first cylindrical holding member and the second cylindrical holding member are juxtaposed in a direction perpendicular to a first optical axis of the first laser beam emitted from the first laser light source,
   the first cylindrical holding member is fitted in an interference fitting manner in two positions which are away from each other in the first optical axial direction of the first laser beam emitted from the first laser light source in the first cylindrical hole of the frame member, and
   the second cylindrical holding member is fitted in an interference fitting manner in two positions which are away from each other in a second optical axial direction of the second laser beam emitted from the second laser light source in the second cylindrical hole of the frame member.

4. An optical scanning apparatus according to claim 3, wherein
   the first cylindrical holding member is fitted in an interference fitting manner in at least three positions in a circumferential direction in the two positions which are away from each other in the optical axial direction in the first cylindrical hole, and
   the second cylindrical holding member is fitted in an interference fitting manner in at least three positions in the circumferential direction in the two positions which are away from each other in the second optical axial direction in the second cylindrical hole.

5. An optical scanning apparatus according to claim 3, further comprising one fixing member which fixes both of the first cylindrical holding member in the first optical axial direction and the second cylindrical holding member in the second optical axial direction to the frame member.

* * * * *